2,809,132

METHOD OF COATING A SUPPORT WITH A LEAD SULPHIDE LAYER

Jan Bloem, Eindhoven, Netherlands, assignor, by mesne assignments, to North American Philips Company, Inc., New York, N. Y., a corporation of Delaware No Drawing. Application April 25, 1956, Serial No. 580,471

Claims priority, application Netherlands May 3, 1955

4 Claims. (Cl. 117—200)

The invention relates to methods of coating a support with a lead sulphide layer and to semi-conductive devices, more particularly photo-sensitive devices, provided with a lead sulphide layer produced by the said methods.

It is well known that continuous lead sulphide layers exhibiting satisfactory adherence can be precipitated on a support from a mixture of solutions of lead acetate and of thio-urea in the presence of alkali hydroxide. For this purpose, a support consisting, for example, of glass, quartz, ceramic material, plastic or the like, is introduced into a mixture of equal parts of aqueous solutions containing 40% of lead acetate, 5% of thio-ureau and 65% of NaOH, respectively, which mixture is heated to a temperature of 50° C.

This method has the disadvantage that use must be made of very strong solutions of caustic soda or the alkali hydroxide which absorb carbon dioxide from the air. A further disadvantage consists in the fact that due to the absorption of alkali ions in the PbS-lattice layers of high p-conductivity may be produced.

According to the invention, a lead-sulphide layer is precipitated at a temperature of more than 50° C. on a support from solutions of lead acetate and thio-urea in the presence of hydrazine.

The substitution of hydrazine for alkali hydroxide in accordance with the invention has the advantage that the tendency for the formation of lead-sulphide layers of high p-conductivity is reduced. The layers produced may even become about intrinsically conductive or slightly n-conductive. A further advantage consists in that the layers produced are more even than those precipitated in the presence of a strong solution of caustic soda. The method can be carried out by mixing solutions of lead acetate, thio-urea and hydrazine and subsequently heating the mixture to a temperature exceeding 50° C. Alternatively, the solutions may previously be heated separately to obtain the reaction temperature and mixed subsequently, or to a heated mixture of two solutions the third heated solution may be added. When the heated solutions are mixed, the lead acetate solution is preferably added last.

The concentrations of the lead acetate, thio-urea and hydrazine may be varied within wide limits when using the invention. Results which are always satisfactory are produced with the use of concentrations of the said substances of about 1/3, 1/2 and 3 gram-molecules, respectively, per litre of the reaction mixture. However, deviations from these concentrations by multiplying or dividing the quantities mentioned by a factor of about 3 are permissible.

The semi-conductive lead-sulphide layers produced exhibit photo-conductivity. In air the layers are not stable owing to the resulting oxidation, so that they become more highly p-conductive. When the layers are to be used in air and not in vacuo or in a protective gas atmosphere, the heating process is preferably repeated in air. By heating for a period of from 20 to 40 hours at temperatures between 70° C. and 120° C. the lead-sulphide is stabilized against further air oxidation.

In order to enable the lead-sulphide layers in accordance with the invention to be used in semi-conductive devices, electrodes may be provided on the layers, for example, with the use of a graphite suspension. However, preferably the electrodes are previously provided on the support, after which the lead-sulphide layers are precipitated. This latter method is advantageous, since the provision of the electrodes is not restricted to the methods in which no reactive chemicals or high temperatures are used which might change the conductivity properties of the lead-sulphide. The electrodes may be produced, for example, by the deposition of noble-metal layers from vapour or by firing a silver suspension or a silver oxide suspension to the support. As an alternative, electrodes may be produced by spraying a tin chloride solution on the heated support, so that conducting tin oxide is produced.

Example I

A glass plate is provided with electrodes by coating it on one side, with the exception of a strip of $15 \times 2$ mms. extending throughout the whole width, with a conducting tin oxide layer by spraying a solution of tin chloride on the glass plate which is heated to about 500° C.

The glass plate is subsequently arranged in a mixture of equal volumes of solutions containing, per litre, 400 gms. of lead acetate, 50 gms. of thio-urea and 500 gms. of hydrazine hydrate, respectively. The mixture is stirred and subsequently heated to a temperature of about 100° C. After a period of from 5 to 10 minutes the precipitation reaction is completed and an even lead-sulphide layer is deposited on the glass plate. The layer produced is washed in water and, if required, subsequently in a 1% solution of ammonia sulphide, after which it is dried with the use of alcohol.

With the above mentioned width of 15 mm. and an electrode spacing of 2 mms., the lead-sulphide layer in the non-irradiated condition has a resistance of $5 \times 10^5$ ohms. On irradiation with an intensity of 0.1 w./sq. cm. ($=10^{18}$ quanta/sec./sq. cm.) the resistance is reduced to $1.2 \times 10^5$ ohms.

The resistance properties of the layer change on exposure to air. Without irradiation the resistance increases and subsequently decreases. Initially the layer has n-conductivity and contains about $10^{17}$ carriers per cc. After being exposed to air for a period of 5 days, the layer has assumed p-conductivity, the number of carriers being likewise about $10^{17}$ per cc., after which it remains unchanged. By heating the lead-sulphide layer in air to a temperature of 120° C. this result is produced already after about 10 hours.

Example II

In a temperature-controlled vessel, equal parts of solutions of lead acetate, thio-urea and hydrazine hydrate as described in Example I, are heated to 80° C. The solutions of thio-urea and hydrazine are first mixed and subsequently the solution of lead acetate is added to them. A glass plate is arranged in the mixture, which is stirred by bubbling through nitrogen containing a few percents of hydrogen and no oxygen. After 10 minutes a uniform lead-sulphide layer is deposited on the glass plate, which layer subsequently is washed and dried.

On the layer, which is 15 mms. wide, two electrodes are arranged, which are spaced apart from each other by 2 mms. and extend throughout the entire width of the layer, with the use of a graphite suspension.

Initially the layer produced has a resistance of $10^6$ ohms, when not exposed to incident radiation. By irradiation with an intensity of 0.1 w./sq. cm. ($=10^8$ quanta/sec./sq. cm.) the resistance is reduced to $3 \times 10^5$ ohms. By exposing the layer to air, the initial n-type conductivity changes to p-type conductivity. By heating the layer produced in air to a temperature of 100° C. for 20 hours, the resistance is stabilized at $6 \times 10^5$ ohms.

What is claimed is:

1. A method of providing a semi-conductive, lead sulphide layer, which comprises the deposition on a supporting member by chemical reaction at a temperature exceeding 50° C. of solutions of lead acetate with thio-urea in the presence of hydrazine.

2. A method of making a supported, semi-conductive, lead sulphide layer, which comprises introducing a support into a solution containing lead acetate, thio-urea and hydrazine maintained at a temperature in excess of 50° C. thereby to deposit thereon a layer of lead sulphide.

3. A method of making a supported, semi-conductive, lead sulphide layer, which comprises introducing a support into a solution containing lead acetate, thio-urea and hydrazine maintained at a temperature in excess of 50° C., thereby to deposit thereon a layer of lead sulphide, removing and drying the supported lead sulphide layer, and thereafter heating said supported lead sulphide layer at a temperature between 70° and 120° C.

4. A method as set forth in claim 3 wherein hydrazine hydrate is employed, and electrical connection is thereafter made to the lead sulphide layer.

References Cited in the file of this patent

UNITED STATES PATENTS

| | | |
|---|---|---|
| 2,079,690 | Grisdale | May 11, 1937 |
| 2,614,944 | Lytle | Oct. 21, 1952 |
| 2,659,682 | Anderson | Nov. 17, 1953 |